G. C. WORTHINGTON.
GOLF BALL.
APPLICATION FILED AUG. 28, 1916.

1,285,878.

Patented Nov. 26, 1918.

Inventor:
George C. Worthington
by J. O. Richey
his Atty.

UNITED STATES PATENT OFFICE.

GEORGE C. WORTHINGTON, OF ELYRIA, OHIO.

GOLF-BALL.

1,285,878.             Specification of Letters Patent.     Patented Nov. 26, 1918.

Application filed August 28, 1916.  Serial No. 117,146.

*To all whom it may concern:*

Be it known that I, GEORGE C. WORTHINGTON, a citizen of the United States, residing at Elyria, in the county of Lorain and State of Ohio, have invented certain new and useful Improvements in Golf-Balls; and I do hereby declare the following to be a full, clear, and exact description of the invention, such as will enable others skilled in the art to which it appertains to make and use the same.

My invention relates to golf balls and has for its object improvements in the same, whereby the balls are made more responsive to heavy blows and less responsive to light blows than the rubber cored golf balls now in use.

It will be understood that in the use of golf balls they are at times hit hard in order that they may be driven the maximum distance, and at other times they are struck lightly where accuracy and short distance are desired. Of course, where the long drives are to be made, it is desirable that the ball should be highly resilient, but where the short shots are made and accuracy is desired, the balls should be less lively.

In golf ball terms, I aim to produce a ball which drives better, and which is better for approaching and putting than the rubber cored balls at present used. In the rubber-cored balls heretofore made, so far as I am aware, weighting material of one kind or another has been used, and the same has tended to deaden the ball, thereby reducing the distance the ball can be driven. I greatly reduce the deadening effect on the ball produced by the use of such mediums, and consequently increase the distance of the ball.

In comparative tests made with a standard driving machine upon balls made in accordance with this invention and the best standard rubber-cored balls now available, the balls embodying this invention carried fifteen to twenty yards farther for equal blows applied to balls of the two types.

In general, my improvement consists in employing in the ball a winding under tension of vulcanized weighted rubber thread or tape, the weighting material preferably being finely divided and of a metallic salt, or other neutral medium, which will not assail the rubber. To secure the best results, the weighting material is uniformly distributed throughout the vulcanized rubber. The core of the ball may be constructed in part or entirely of the vulcanized rubber thread or tape thus weighted. When the entire core is so made, the weighting material may be more distributed, thus tending still less to deaden the ball.

No doubt the invention and the objects which I have named, as well as others, will be better understood from a description of embodiments of the same.

Figure 1:
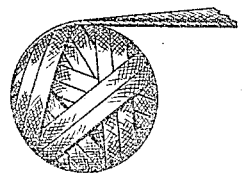
Figure 1 is an elevation of a center consisting of rubber tape employed in a golf ball utilizing my invention.
Figure 5:
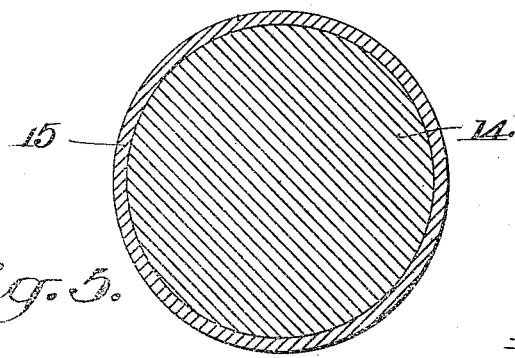
Fig. 5 is a section through a third type of golf ball employing my invention.

In Fig. 1 the center is formed by winding under tension rubber tape which has been vulcanized and in which there has been incorporated, preferably uniformly distributed through the rubber, finely divided weighting material, such for example, as dry white lead. I prefer to use a neutral substance or one which will not assail the rubber, metallic salts, especially lead salts, being most convenient. The proportions of the weighting material and the rubber may be varied as is best suited for the particular type of ball to be made. For example, where heavy centers are used, the proportions may be in weight two portions of white lead to one of rubber. For lighter balls, these proportions may be one to one, and where the ball is wound throughout with the weighted vulcanized tape or thread, as shown in Fig. 5, they may be one-fourth white lead and three-fourths rubber.

Figure 2:
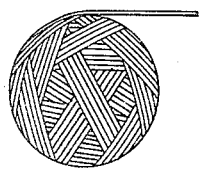
Fig. 2 is the same view of the same kind of a structure except that rubber thread is used.

In Fig. 2 rubber thread which is vulcanized, and in which has been incorporated the weighting material, is used to form the center.

Figure 3:
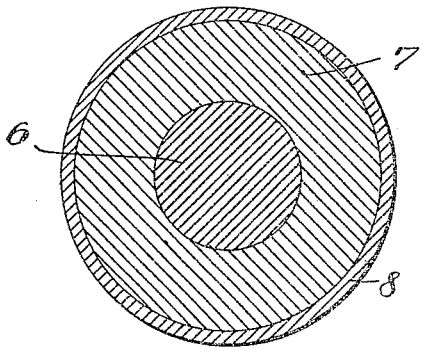
Fig. 3 is a section through a golf ball employing my invention.

In Fig. 3 I have shown a ball having a center 6. About the center 6 there is wound under tension ordinary vulcanized rubber tape or thread, and a cover 8 is placed upon the same.

Figure 4:
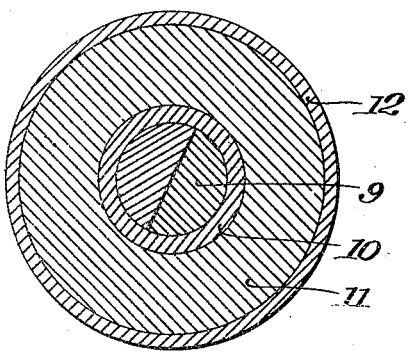
Fig. 4 is a section through a second type of golf ball employing my invention.

Fig. 4 shows another type of ball employing a different type of center, shown at 9, which is unweighted. About the center 9 there is a winding of vulcanized weighted rubber tape or thread, shown at 10, and about the winding 10 there may be a winding, shown at 11, of ordinary vulcanized rubber tape or thread, which is wound under tension, the whole being inclosed by a cover 12.

In Fig. 5 the whole core 14 of the ball is formed by winding under tension rubber tape or thread which has been vulcanized and in which there is incorporated finely divided weighting material in the manner which I have described. A cover 15 is inclosed about the core 14. The form of ball shown in Fig. 5 possesses over the other types of balls I have described, and those which are now in use, the advantage of having its weighting material so uniformly distributed that there is no dead or partially deadened section of the same. It is a fact that where the weighting material can be uniformly distributed through the rubber, the deadening effect can be reduced to a minimum, with a result that the ball will be much more resilient when struck hard blows, but at the same time no more responsive to slight blows than otherwise constructed, since the deadening effect of the material employed throughout the ball is sufficient to make the ball dead enough that it will not respond too lively for light blows.

The weighted core parts of the balls thus formed can be more conveniently and cheaply made than the corresponding weighted parts employed heretofore, since, for one reason, they may be wound in the same way and by the same means as the other rubber windings employed in making standard rubber-cored balls.

I have shown these particular embodiments and these particular details for the purpose of describing the invention. I do not wish to be limited to these embodiments or these details, as it will be apparent to anyone skilled in the art that many departures may be made from the same without departing from the spirit of the invention.

I claim:—

1. As an article of manufacture, a golf ball employing weighted vulcanized rubber thread or tape wound under tension.

2. In a golf ball, the combination of a center made of winding under tension weighted vulcanized rubber tape or thread, windings of unweighted vulcanized rubber thread or tape about the center thus forming a core and a cover on said core.

3. As an article of manufacture, a golf ball having a core made partly or entirely of vulcanized rubber thread or tape, weighted with heavy finely divided metallic salt and wound under tension.

4. As an article of manufacture, a golf ball provided with a core made partly or entirely of vulcanized rubber thread or tape in which there is incorporated finely divided weighting material uniformly distributed through the rubber.

5. A core for a playing ball formed by a winding of tensioned vulcanized rubber which is incorporated with granulated weighting material, said core being maintained in a permanent state of compression.

6. A playing ball comprising a center composed of a tensioned winding of soft vulcanized rubber, a weighting material incorporated with said rubber, an exterior winding of tensioned material upon the center, and an outer cover inclosing the core and surrounding winding, said core being maintained in a permanent state of compression independently of the surrounding winding.

7. A core for a playing ball formed in part or in whole by a winding of tensioned rubber which is incorporated with granulated weighting material, said core being maintained in a permanent state of compression.

8. A playing ball comprising a center of a tensioned winding of soft rubber, a weighting material incorporated with said rubber, an exterior winding of tensioned material upon the center and an outer cover inclosing the core and surrounding winding, said core being maintained in a permanent state of compression independently of the surrounding winding.

In witness whereof I have hereunto signed my name this 25th day of August, 1916.

GEORGE C. WORTHINGTON.